L. B. KRUM.
PNEUMATIC TIRE.
APPLICATION FILED SEPT. 13, 1907.
952,675.
Patented Mar. 22, 1910.
2 SHEETS—SHEET 1.
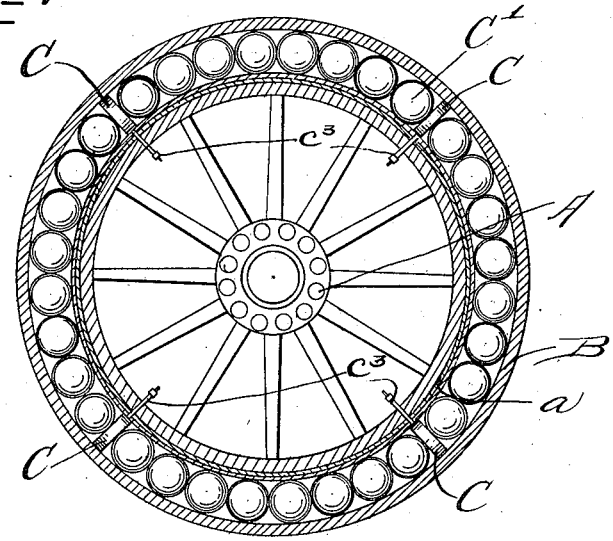
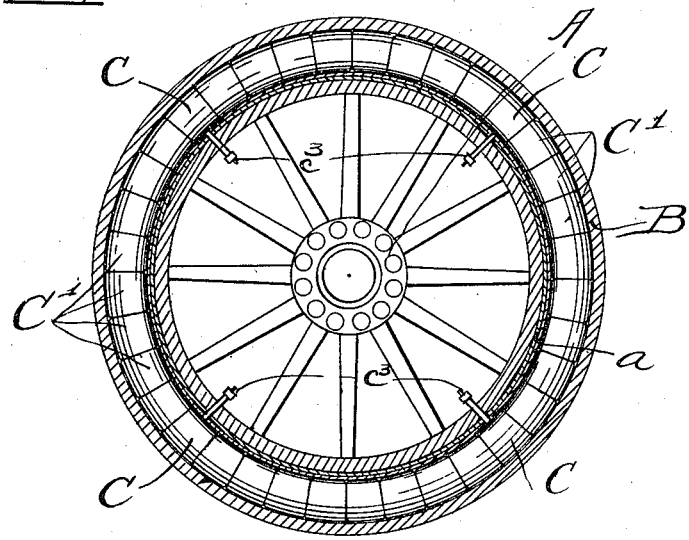

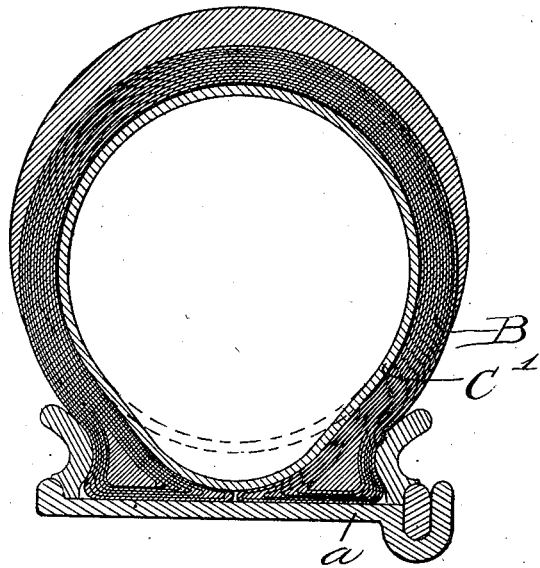
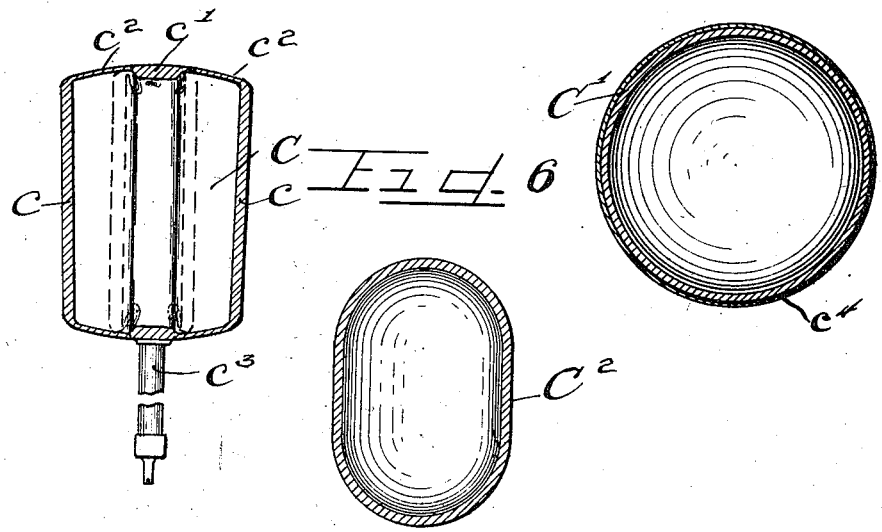

UNITED STATES PATENT OFFICE.

LOUIS B. KRUM, OF CHICAGO, ILLINOIS.

PNEUMATIC TIRE.

952,675.  Specification of Letters Patent.  Patented Mar. 22, 1910.

Application filed September 13, 1907. Serial No. 392,650.

*To all whom it may concern:*

Be it known that I, LOUIS B. KRUM, a citizen of the United States, and a resident of Chicago, Cook county, Illinois, have invented certain new and useful Improvements in Pneumatic Tires; and I do hereby declare that the following is a full, clear, and exact description of the same, reference being had to the accompanying drawings, and to the letters of reference marked thereon, which form a part of this specification.

Heretofore many devices have been constructed to prevent puncture and consequent deflation of pneumatic tires. These have consisted usually of metallic sections either incorporated in the tire casing or secured thereon and frequently instead of preventing puncture are the cause thereof. None of the devices heretofore put upon the market have been of such a nature as to insure protection against deflation of the tire and in consequence of the frequent repairs and large expense occasioned for new inner tubes for pneumatic tires, the use of such tires has been avoided wherever possible.

The object of this invention is to provide a construction adapted for use with outer casings of any suitable kind whereby a pneumatic tire practically puncture proof, is provided, and the use of which enables pressure to be restored to the tire without removal from the wheel, even though the tire should be punctured in several places.

It is a further object of my invention to afford an exceedingly cheap, durable and economical construction whereby should any portion of the interior inflating means be injured or destroyed, renewal may be effected at slight expense thereby avoiding the necessity of renewing all the inflating means for the tire as in the case where inner tubes are used.

The invention consists in the matters hereinafter described and more fully pointed out and defined in the appended claims.

In the drawings: Figure 1 is a face view of an automobile wheel provided with a tire embodying my invention, the outer casing of which is in vertical section, the tire being shown deflated. Fig. 2 is a similar view showing the tire inflated. Fig. 3 is an enlarged transverse section of the casing showing one form of universal rim. Fig. 4 is an enlarged face view of one of the inflating sections of the tire. Fig. 5 is an enlarged section of one of the balls embodied in my invention. Fig. 6 is a similar view showing a slight modification in the form of the ball.

As shown in the drawings: A indicates as a whole an automobile wheel, on the rim $a$ of which is engaged a pneumatic tire casing B which may be a clencher casing as shown in Fig. 3 or any other suitable construction and which is engaged to the rim $a$, which may be of any kind as is usual for the particular class of casing used. Within said casing, as shown in Figs. 1 and 2, are a plurality of inflatable elements C comprising a hollow member having relatively flat and stiff end members $c$ conveniently circular in form and adapted to fit in the tire casing and connected as shown to a central stiffened ring of rubber or other suitable material $c'$ by means of flexible walls $c^2$ which when said section is inflated, permit said walls $c$ to move oppositely to a suitable distance from each other and when deflated, permit said walls to close inwardly upon the central ring $c'$ as shown in dotted lines in Fig. 4. Each of said inflatable sections is provided with an air valve $c^3$, such as have heretofore been used for inflating the inner tubes for pneumatic tires. As shown, a plurality of said inflatable sections are used, the number, of course, varying with the size of the wheel, the pressure to be maintained in the casing, and other conditions including, of course, the preference of the user.

As shown in Figs. 1, 2 and 4, such inflatable members are inserted in the casing at equal distances apart with the air valve therefor projecting radially inward through the rim of the wheel as is usual. Arranged between each pair of inflatable sections are a plurality of resilient balls C' which may be constructed in any suitable manner to render the same gas tight and are filled with a suitable gas to maintain a considerable pressure. Said balls in diameter conform approximately with the interior diameter of the casing, and may, if desired, be covered with fabric $c^4$ of any suitable kind to increase the strength thereof, but usually may be made of a good quality of rubber or other resilient material adapted to contain a gas. They may of course, be either spherical, as shown in Fig. 5, or oval as the ball $C^2$ indicated in Fig. 6, and in any event are preferably of such size as not only to fill the inner circumference of the casing, but also to permit a number thereof being inserted to fill the space between the inflatable sections C before the inflation of such sections, as shown in Fig. 1.

The operation is as follows: Having secured gas filled balls in the casing, as shown in Fig. 1, and in part in dotted lines in Fig. 3, the casing is slid onto the rim and secured in place as is usual, and the inflatable members C are inflated to the desired pressure, thereby pressing the somewhat rigid end sections or walls $c$ oppositely and around the interior of the casing, as shown in Fig. 2, compressing the balls therein to approximately fill the tire casing, the pressure of course, being graduated to the service required. It is to be noted that said balls when said inflatable sections are fully inflated, are thereby pressed inwardly from opposite sides, in consequence forcing the same outwardly at the periphery until a continuous cellular construction entirely fills the casing and before the limit of expansibility of the inflatable members is reached. Should a puncture now occur in any section, but one ball can be affected and that being the case, but a very small quantity of air is permitted to escape, the remaining balls and inflatable sections immediately adjusting themselves to take up the space formerly occupied by the air inside the punctured ball, retaining practically a uniform pressure on the casing.

Of course, I am aware that many details of construction may be varied without departing from the principles of my invention, and I therefore do not purpose limiting this application for patent otherwise than necessitated by the prior art.

I claim as my invention:

1. The combination with a pneumatic tire casing of inflatable members therein having stiff end walls, an air valve in each and a plurality of hollow balls containing fluid under pressure closely fitted between the inflatable members.

2. In a device of the class described a tire casing, a plurality of balls therein, each having an external diameter equal to the internal diameter of the casing and inflatable members in the casing between the balls, each completely filling the casing at the place inserted.

3. The combination with a pneumatic tire casing of short inflatable members therein, an air valve for inflating each of said members and a plurality of gas filled balls between said inflatable members filling the casing and adapted to be compressed by the inflation of said members.

4. In combination with a tire casing, a plurality of independently removable elements fitted therein adapted to be expanded independently and each to the same or different extent, members between said elements adapted to be compressed by expansion of said elements and strengthening coverings for said members.

5. In a device of the class described a casing, balls therein and elements at suitable intervals apart in the casing between the balls each comprising a central ring, flexible material secured thereto, stiff walls secured to the flexible material and a valve for inflating the same.

6. A pneumatic tire comprising a casing, a single layer of inflated balls therein, each ball filling the entire width of the casing and flat inflatable members in the casing between the balls.

In testimony whereof I have hereunto subscribed my name in the presence of two subscribing witnesses.

LOUIS B. KRUM.

Witnesses:
C. W. HILLS,
J. W. ANGELL.